United States Patent
Batzer et al.

[15] 3,694,413
[45] Sept. 26, 1972

[54] POLYURETHANE ELASTOMER RENDERED ANTI-STATIC BY TREATMENT WITH IODINE

[72] Inventors: Richard R. Batzer, Denver; William H. Reichardt, Englewood, both of Colo.

[73] Assignee: The Gates Rubber Company, Denver, Colo.

[22] Filed: April 19, 1968

[21] Appl. No.: 722,565

[52] U.S. Cl............260/75 NA, 74/231 S, 260/75 T, 260/75 TN, 260/77.5 R, 260/77.5 A, 260/91.3 R, 260/93.7, 260/218, 260/DIG. 15
[51] Int. Cl........C08g 22/04, C08g 53/20, F16g 1/14
[58] Field of Search................260/75 TN, 75 NA, 75 AP 77.5 A, 260/340, 349, 2.5 A, 2.5 AK, 77.5 R

[56] References Cited

UNITED STATES PATENTS

| | | | |
|---|---|---|---|
| 3,201,372 | 8/1965 | Wagner | 260/77.5 |
| 3,235,446 | 2/1966 | Shelanski et al. | 260/77.5 |
| 3,248,373 | 4/1966 | Barringer | 260/77.5 |

Primary Examiner—Donald E. Czaja
Assistant Examiner—H. S. Cockeram
Attorney—Raymond Fink

[57] ABSTRACT

This invention discloses the use of certain halogen, and compounds thereof in order to minimize the static tendency of certain types of polymeric substances such as polyethylene terephthalate, rayon, polypropylene, polyvinyl chloride and polyurethane.

5 Claims, No Drawings

POLYURETHANE ELASTOMER RENDERED ANTISTATIC BY TREATMENT WITH IODINE

It is known that certain types of polymers display rather annoying static electric characteristics which tend to discharge in a displeasing manner when the charge is great enough. Typical among such characteristics is carpet made of nylon wherein the annoying static discharge will be anticipated after one has moved across the carpet and comes in contact with a grounding force such as another person.

Such static build-up is also associated with other types of polymers and is equally annoying when products are fabricated from such polymers. This is especially true if such products undergo movements against materials which will build up static charges and will hold the charge until contact with a grounding object. Thus, power transmission belts, tires and other products undergoing dynamic forces will build up rather severe static charges with the accompanying annoyance and in some cases accompanying dangerous tendencies to discharge between a relatively long distance with accompanying sparks. Of course, such sparks can be dangerous when used in an environment of a hazardous atmosphere.

Several approaches have been utilized in order to minimize static build up tendencies, especially with polyolefins. Certain antistatic compositions may be incorporated within such compounds or the material can be coated with such antistatic compositions. However, little progress has been made regarding certain other types of polymers which will exhibit such characteristics such as polyvinyl alcohol, polyethylene terephthalate, polyurethane rubber and viscose rayon.

It has been found that certain halogen, and halide compounds when incorporated with the polymer or used as a coating over the object will greatly minimize the static tendencies. These compounds have been found to be compatible with the polymers and the antistatic inhibition thereby created is of a permanent nature.

Elemental iodine can be incorporated within such compositions and greatly minimize the static tendencies of the composition. Generally, the elemental iodine is reduced to very small particle size and can be incorporated within the polymerizable mixture before the compound is molded, thereby minimizing the static tendencies.

Additionally, it may be of value sometimes to form solutions of the halide compounds and dip the product within the compound thereby imparting the antistatic tendencies to the compound. Thus, fibers which may be used to form the final product can be dipped in an aqueous solution of iodine mixed with potassium iodide. Similarly, solutions of nitrosyl chloride can be used to form a mixture when these mixtures are used to coat the product or fibers from which the product can be made. There seems to be an impregnation and complexing of the material with the polymer to the extent that permanent antistatic properties are imparted.

The static discharge characteristics can be measured essentially be placing material either coated with or containing the antistatic halide compound between conductive aluminum alloy discs. The two discs are separated by spacers of approximately 0.017 inch thickness symmetrically arranged around the edge of the discs. It has been found convenient to use discs of a 6 inch diameter. Samples of material to be tested are placed between the discs after which the discs are put under compression to assure complete contact of the material between the two discs. The entire assembly is then isolated by non-conducting material in order to eliminate stray charges. The plates are then charged with an electrical voltage and a voltmeter is connected between the plates in order to measure the voltage potential created by the charge. The loss of charge between the plate can then be measured over a time period basis and the dissipation rate of the charge between the plates is a measure of the antistatic characteristics imparted to the particular material being tested.

The following chart indicates the effect of the antistatic properties imparted to the material by the treatment with the various halides. A low rate of discharge would indicate high static tendencies or tendencies to accumulate static electrical charges where a comparatively high discharge rate would indicate antistatic properties of the compound or strongly conducting material.

| Material | Treatment | Voltage loss per minute per gram of material |
|---|---|---|
| Air (Control) | None | 4.1 |
| Polyvinyl Alcohol | None | 300 |
| Polyvinyl Alcohol | Iodine Solution Coating | 800 |
| Polyvinyl Alcohol | Nitrosyl Chloride Solution Coating | 12,000 |
| Viscose Rayon | None | 145 |
| Viscose Rayon | Iodine Solution Coating | 760 |
| Viscose Rayon | Nitrosyl Chloride Solution Coating | 6,000 |
| Polyethylene Terephthalate | None | 3 |
| Polyethylene Terephthalate | Iodine Solution Coating | 11 |
| Polyethylene Terephthalate | Iodine Mono Chloride Solution Coating | 2,000 |
| Polyethylene Terephthalate | Iodine Mono Chloride Complex Solution Coating | 700 |
| Polyethylene Terephthalate | Nitrosyl Chloride Solution Coating | 3,700 |
| Polyethylene Terephthalate | Bromine Vapor | 32,000 |
| Polyethylene Terephthalate | Stannous Chloride | 2,700 |
| Polyethylene Terephthalate | Zinc Chloride | |
| Polyethylene Terephthalate | Ethylenimine Coating | 800 |
| Polyurethane Rubber | None | 11 |
| Polyurethane Rubber | Iodine Solution Coating | 1,300 |
| Polyurethane Rubber | 1& by weight of iodine and potassium iodide | 2,100 |
| Polyurethane Rubber | 0.5% by weight Iodine | 9,900 |
| Polyurethane Rubber | 1.0% by weight Iodine Mixture | Too fast for accurate measure. |

The above iodine solutions were approximately 4 percent of iodine and potassium iodide aqueous solutions. Stannous chloride was of approximately the same concentration. The nitrosyl chloride solution was obtained by reacting nitric acid with hydrochloric acid. The gas thus obtained is used in the above experiments after the gas was dried by passing the gas over the drying material which may be calcium chloride. The iodine mono chloride used in the above experiment was used by passing nitrosyl chloride gas into a mixture of iodine and water. The iodine mono chloride liquefies as a cold mixture and is extracted with ether. The ether solution is used as the iodine mono chloride dip.

It was obvious that the effect on material such as polyurethane was so great as to indicate doubt as to the accuracy of the measure. Laboratory equipment whereby accurate measure of the resistivity of the material was used was conducted with standard ASTM techniques (D991–48T) in which either voltage or current is set and the actual resistivity is measured in ohm-centimeters. Obviously, higher resistivity value indicates the greater tendencies to retain the static charge whereas lower resistivity static charge indicates the material has lower resistivity to the static charge and consequently greater discharge rates. Thus, standard polyurethane plates were prepared by mixing in various amounts of iodine into the liquid polyether compound before either polyethers or polyesters containing terminal hydroxy groups was polymerized with organic polyisocyanates to obtain a polyurethane rubber. A control polyurethane, with no antistatic additive gives a value of $1.1 \times 10^{10}$ ohm-centimeters. By merely dipping the sheet into a 4 percent solution of iodine and potassium iodide, the resistivity is cut to $1.2 \times 10^7$ or approximately a magnitude of three times greater tendency of elimination of static charge. By actually incorporating 0.5 percent of iodine and potassium iodide in the material, the resistivity can further be cut to $2.1 \times 10^6$ ohm-centimeters. Finally, ground iodine can be incorporated in various amounts. The resistivity of 0.25 percent by weight of iodine in potassium iodide is $8.5 \times 10^7$ ohm-centimeters. By merely increasing the amount of elemental iodine to 0.5 percent by weight, the resistivity is further reduced to a resistivity of $9.9 \times 10^6$ ohm-centimeters. For the additions of iodine up to 5.0 percent by weight of iodine only slight reductions of resistivity are noted to a maximum effect of approximately $1.8 \times 10^5$. Thus, it is obvious that incorporating merely 0.5 percent by weight of elemental iodine into the polyurethane is for all practical purposes sufficient to obtain optimum minimization of static tendencies.

Some of the above mixtures or treatments will impart slight discoloration; however, it is obvious that the result minimizes the surface static charge quite impressively. The antistatic characteristics imparted to the material significantly reduces static charges build up to the extent that no charge transfer, sparking or static shock is experienced with material so treated. The material is made strongly conducting.

The foregoing detailed description is given for the purposes of illustration only and is not intended to limit the scope of the present invention which is to be determined from the appended claims.

What we claim is:

1. A composition having antistatic properties comprising a polyurethane rubber polymer and a coating of iodine and potassium-iodide mixture.

2. An antistatic power transmission belt made of polymeric material wherein the non-reinforcement portions of the belt such as the body portion are manufactured substantially from a polyurethane rubber, obtained by reacting polyisocyanate with a polyether or polyester polyol containing terminal hydroxy groups wherein the improvement comprises non-reinforcement portions comprising polyurethane rubber which has been treated with iodine or a mixture of iodine and potassium iodide.

3. The method of minimizing static build-up and discharge characteristics of an article of manufacture consisting of polyurethane rubber comprising a step of treating the polyurethane rubber by immersing the article in an iodine and potassium-iodide solution, removing and allowing the thereby coated article to dry.

4. A method of minimizing static build-up and discharge characteristics of a polyurethane article of manufacture wherein the improvement comprises curing and polymerizing a polyurethane rubber formed by reacting a material from the group consisting of a polyether or polyester containing terminal hydroxy groups with an organic isocyanate and subsequent to the curing of said article of manufacture, treating the polyurethane article with a solution of iodine and potassium-iodide.

5. In a method of minimizing the static discharge from a polyurethane power transmission belt, in which the polymeric portion of said belt comprises a polyurethane rubber obtained by curing a liquid polymerizable polyurethane mixture which is the reaction product of a polyisocyanate and a polyether or polyester polyol containing terminal hydroxy groups, the improvement comprising incorporating from about 0.25 to about 5.0 parts by weight of elemental iodine based on the weight of the polyurethane by reducing said iodine to very small particle size and incorporating said iodine within said polymerizable mixture, and then molding said polymerizable mixture.

* * * * *